United States Patent [19]

Moriki

[11] 4,103,138

[45] Jul. 25, 1978

[54] APPARATUS FOR BUILD-UP WELDING WITH COOLING OF A SEALED AND LUBRICATED TRACK LINK

[75] Inventor: Y. Moriki, Tokyo, Japan

[73] Assignee: Maruma Jyusharyo Kabushiki Kaisha, Tokyo, Japan

[21] Appl. No.: 656,869

[22] Filed: Feb. 10, 1976

[30] Foreign Application Priority Data

Mar. 25, 1975 [JP] Japan .................................. 50-34940

[51] Int. Cl.$^2$ .............................................. B23K 9/04
[52] U.S. Cl. .................................. 219/76.11; 228/46; 228/222
[58] Field of Search ................... 128/240, 241; 219/76, 219/120; 228/222, 46; 134/167 R, 108 R; 285/9 R; 141/59

[56] References Cited

U.S. PATENT DOCUMENTS

| | | | |
|---|---|---|---|
| 642,489 | 1/1900 | Pyke | 285/9 R |
| 668,303 | 2/1901 | Beyer | 141/59 |
| 752,361 | 2/1904 | Schwartz | 128/241 |
| 1,262,274 | 4/1918 | Shelor | 141/59 |
| 1,464,069 | 8/1923 | Gerber | 285/9 R |
| 1,776,357 | 9/1930 | Hart | 128/140 |
| 1,834,453 | 12/1931 | Gavaza | 141/59 |
| 2,039,217 | 4/1936 | Goddard | 228/46 |
| 2,381,454 | 8/1945 | Huth | 141/59 |
| 2,388,587 | 11/1945 | Wilson | 219/120 |
| 2,396,956 | 3/1946 | Larson | 228/46 |
| 3,227,475 | 1/1966 | Sinkinson | 285/9 R |
| 3,514,568 | 5/1970 | Frus | 219/76 |
| 3,895,209 | 7/1975 | Moriki et al. | 219/76 |
| 3,911,973 | 10/1975 | Casteline | 141/59 |

Primary Examiner—E. A. Goldberg
Attorney, Agent, or Firm—Oblon, Fisher, Spivak, McClelland & Maier

[57] ABSTRACT

A method and apparatus for feeding coolant to the interior of a connecting pin during build-up welding of a track link assembly, for protecting the peripheral seal members of the connecting pin from the welding heat, comprising a coolant charging and discharging adapter having a forcibly butting conical shaped end to be placed in contact with an opening in the lateral end face of the connecting pin and an elongate pipe for feeding a coolant through said adapter into said connecting pin interior. The coolant is removed continuously or intermittently during welding through an annular passageway formed in the adapter concentrically about the pipe, or through a passageway similarly formed by an insertion portion carried by said adapter. The adapter is supported by a suitable support member, being aided by a compression spring disposed therebetween, and connected to a retractable mounting plate urged by fluid pressure operated cylinder and piston means for maintaining the adapter forcibly butted against the end face of the connecting pin.

14 Claims, 4 Drawing Figures

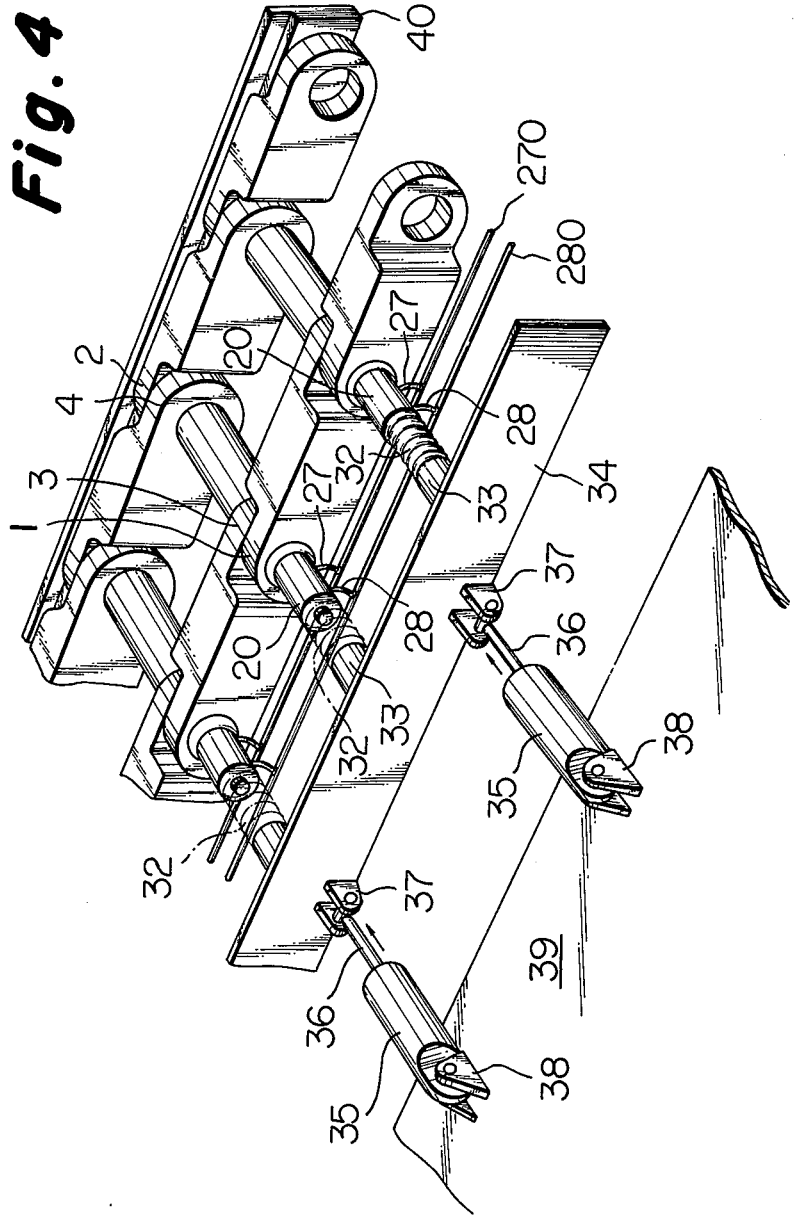

APPARATUS FOR BUILD-UP WELDING WITH COOLING OF A SEALED AND LUBRICATED TRACK LINK

BACKGROUND OF THE INVENTION

1. Field of the Invention

The present invention relates to a process for the build-up welding, or submerged arc welding, of the worn surface of the sealed and lubricated track link with its joint portion having the lubricating oil seal, and also to a cooling device for the protection of the seal members.

2. Description of the Prior Art

As the conventional track link is constructed simply by combining each pair of adjacent links with a single connecting pin, these links can be welded in a build-up process on a work bed of a build-up welding machine, after a series of connected links have been removed from a drive unit of a bulldozer.

However, the build-up welding of a sealed and lubricated track link assembly, which has recently come into general use, presents an inconvenience since the connecting bushings and pins must be first removed to disassemble the track link assembly into a unit link, in order to insure that the seal members will not be degraded or damaged by the welding heat.

SUMMARY OF THE INVENTION

A primary object of the present invention, therefore, is to provide a method of continuous build-up welding of a sealed and lubricated track link assembly, similar to the welding methods employed with the conventional link assembly.

Thus, the apparatus of the present invention is designed to take advantage of the fact that the connecting pins of a sealed and lubricated track link assembly have oil holes at each end, and to circulate continuously a coolant, such as cooling water, all through the inside of the oil holes during the build-up welding, thus preventing the burning-out of the seal members.

Accordingly, the foregoing object and others as well are achieved by a process for build-up welding of a sealed and lubricated track link assembly which features inserting, or forcibly butting, an adapter having two fluid passages for charging and discharging coolant against an oil hole formed in the lateral end surface of a link connecting pin to create a water-tight fit therewith, and feeding and draining a coolant continuously or intermittently into the oil hole, with the track link to be welded being cooled from its inside, while simultaneously performing a build-up welding operation thereon.

An apparatus for feeding coolant to the interior of a connecting pin during build-up welding of the track link assembly according to the method just described, so as to protect the peripheral seal members of the connecting pin from the welding heat, comprises a coolant charging and discharging adapter having a forcibly butting conical-shaped end to be placed in forced contact with an opening in the lateral end face of the connecting pin for the sealed and lubricated track link assembly and an insertion portion connected to the forcibly butting conical face for being inserted into an oil hole in the link connecting pin. Arranged within both the conical butting face and the insertion portion of the adapter are at least two fluid passages designed for charging and discharging the coolant. The adapter is supported by a suitable support member, being aided by a compression spring disposed therebetween, and connected to a convenient retractable means for generating compression power on the compression spring for maintaining the the adapter forcibly butted against the end face of the connecting pin.

The foregoing mode of structure further permits eliminating the disassembly of the link assembly to save working hours and also permits cleaning the inside of the oil holes to remove solid mass therein which is undesirable to lubrication.

BRIEF DESCRIPTION OF THE DRAWINGS

Other objects, features and attendant advantages of the present invention will be more fully appreciated as the same becomes better understood from the following detailed description, when considered in connection with the accompanying drawings, wherein like reference numerals designate like or corresponding parts, and in which:

FIG. 4 is a perspective view of the apparatus of the present invention, illustrating the practical working condition thereof when the track link assembly is placed on a welding bed.

DETAILED DESCRIPTION OF THE ILLUSTRATED EMBODIMENTS

Figure 1:
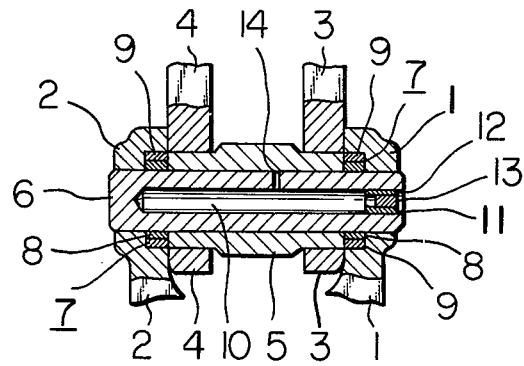
FIG. 1 is a partial cross-section view of a track link connection.

Referring now to the drawings, and more particularly to FIG. 1 thereof, in the usual structure of a sealed and lubricated track link assembly, the link elements 1, 2, 3 and 4 are connected together by a bushing 5 and a connecting pin 6. Seal members 7 are disposed in the external end planes of the bushing 5 and are fitted concentrically about the pin 6. The seal members 7 consist of radially inwardly disposed thrust rings 8 and radially outwardly disposed oil-resistant rings 9, of polyethylene or other suitable material. An oil hole 10 formed axially in the connecting pin 6 has an opening 11 at one end, a rubber stopper 12 and a plug 13 disposed in the opening 11, and a fine oil feed orifice 14 formed radially in the side wall of the pin 6.

The apparatus of the present invention will now be described. A coolant feeding adapter 20 of substantially cylindrical configuration has a conical end portion 21 providing a face which may be forcibly abutted with the opening 11 of a connecting pin 6. A tubular insertion portion 22 of the adapter 20 may be readily inserted into the oil hole 10 and the coolant may be introduced through an elongate pipe 23 which protrudes along the center axis of the adapter 20 and is, at least along a part of its length, concentric with the tubular insertion portion 22. An annular returning passage 24 is formed inside the adapter between the coolant introducing pipe 23 and the tubular insertion portion 22. A radial drain hole 25 formed in the adapter 20 is connected to the returning passage 24 adjacent one end thereof, being closed by a plug 26, through which a flexible hose 27 is connected to the drain hole and returning passage. A coolant feeding hose 28, on the other hand, is connected through a plug 29 to a water feed hole 30 formed in the adapter and connected to the pipe 23. The rear end of the pipe 23 is closed by a blind cover 31 fitted thereto. The hoses 27 and 28 are connected to common pipes 270 and 280, respectively, as shown in FIG. 4.

As further shown in FIG. 4, a compression spring 32 is utilized to apply thrust to the adapter. Support members 33, being provided one each for each adapter, are mounted to a mounting plate 34 so as to be variable in pitch, according to the respective link pitch. The mounting plate 34 is connected to a retractable mechanism for generating compression power, such as a cylinder 35, which may be actuated pneumatically or hydraulically, through a rod 36 and a bracket 37 secured on the mounting plate. A bracket 38 for the other end of the cylinder 35 is incorporated in a fixed member 39, such as a welding bed, and a stopper 40 is mounted opposite the mounting plate 34, but lower than the link.

As regards the operation of the apparatus, the track link, first being dismounted by removing the rubber stopper 12 and the plug 13 and by draining lubricant from its pin 6, is placed on the welding bed, as shown in FIG. 4. The cylinder 35 is then actuated to advance the mounting plate 34 and, after the coolant introducing pipe 23 is inserted into the oil hole 10 of the pin 6, while the tapered face of forcibly-butting face 21 of the adapter is brought into close contact with the opening circumference of the oil hole, the coolant feeding pump, not shown, is actuated to forcibly feed coolant. Thereafter, the welding arc is ignited to initiate the build-up welding process.

Figure 2:
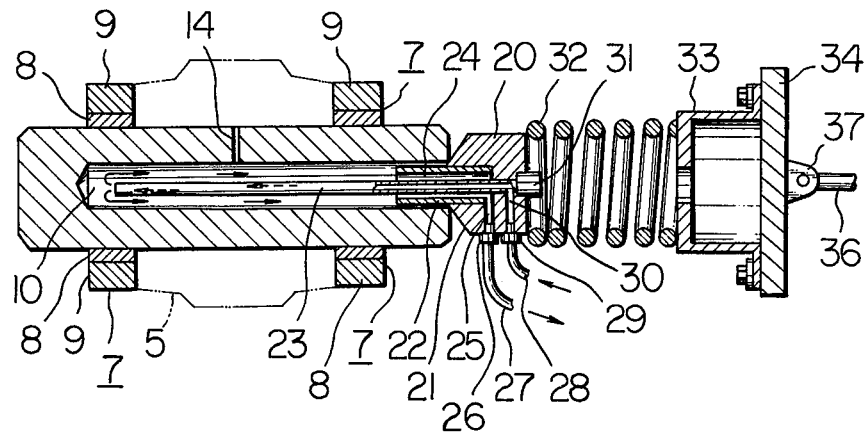
FIG. 2 is an enlarged cross-section view showing the relation of the coolant feeding adapter to the link connecting pins in the working condition of the present invention.

In this case, the insertion portion 22 of the adapter 20 need not be in close contact with the internal face of the oil hole, because the butting face 21 of the adapter is pressed tightly and almost uniformly to the circumference of the opening by the effect of the compression coil spring 32 so as to maintain the water tightness thereof. The forcibly-fed coolant passes from the hose 28, through the pipe 23, and is discharged from the end of the pipe 23, and, after filling outside the pipe or the whole zone of the oil hole and taking the welding heat transmitted to the pin and the bushing, passes through the annular returning path 24 to flow out through the drain hose 27. The direction of coolant circulation is illustrated by the arrows in FIG. 2.

The coolant preferably should be forcibly fed, not only during the welding operation, but also after the completing of the welding operation for removing the heat remaining therefrom.

According to this invention, as the seal members fitted to the periphery of the pins are maintained at a temperature below their heat-resisting temperature, the seal members are prevented from thermal degeneration, so that the track links may be subjected to the build-up welding without removal of the pins.

Obviously, many modifications and variations of the present invention are possible in light of the foregoing teachings.

Figure 3:
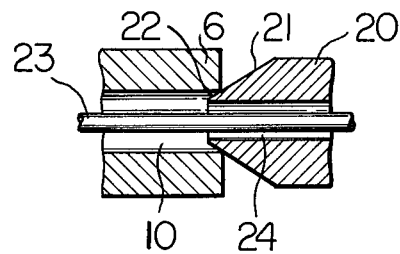
FIG. 3 is a partial and enlarged view in cross-section of another embodiment, being a modification of the shape of the adapter end.

For example, in the embodiment illustrated in FIG. 3, wherein a modification of the adapter 20 is illustrated and the insertion portion 22 is essentially eliminated and the conical end face 21 of the adapter 20 is so tapered as to be slightly insertable into the oil hole 10 of the connecting pin 6. In this case, the returning passage 24 is constituted by the annular space defined between the internal periphery of a bore provided in the adapter 20 and the coolant introducing pipe 23. Obviously, the drain hole 25 continues to be connected to the passage 24, as in the embodiment of FIG. 2, and the rear of the bore forming the passage 24 must be closed in a suitable manner. As with the embodiment of FIG. 2, in this case also, the butting face 21 of the adapter is pressed tightly and uniformly against the circumference of the opening of the oil hole by the effect of the compression coil spring 32 so as to maintain the water tightness thereof.

Thus, according to the present invention, the design and arrangement of the coolant feeding piping and the circulation passage for the adapter are discretional, and also the mounting position of each hose is not critical. Furthermore, the feeding direction of the coolant may be reversed, and the feed system may be a suction system, rather than the forcible feeding system described herein.

Accordingly, it is to be understood that within the scope of the appended claims, the present invention may be practiced otherwise than as specifically described herein.

What is claimed as new and desired to be secured by Letters Patent of the United States is:

1. An apparatus for feeding and draining coolant through the interior of a connecting pin of a sealed and lubricated track link assembly, during a build-up welding operation thereon, comprising:
   an adapter having first fluid passage means therein for introducing said coolant into said connecting pin interior and second fluid passage means disposed between said connecting pin interior and said first fluid passage means and extending parallel to said first fluid passage means for directly discharging said coolant from said first fluid passage means and from said connecting pin interior;
   means for resiliently biasing said adapter toward said connecting pin in water tight contact with said connecting pin; and
   means for performing said build-up welding operation associated with said connecting pin.

2. An apparatus according to claim 1, wherein said first fluid passage means comprises an elongate pipe supported within said adapter and protruding from one end thereof, being adapted to be inserted within the connecting pin interior, and a feed hole formed in said adapter body, extending from the exterior thereof to a part of said pipe positioned within said adapter.

3. An apparatus according to claim 1, wherein said second fluid passage means comprises a tubular insertion portion being carried by said adapter and protruding from one end thereof for insertion into said connecting pin interior, and a drain hole in said adapter, extending from the exterior thereof and opening into a part of said insertion portion positioned within said adapter.

4. An apparatus according to claim 1, wherein one end of said adapter has a conical configuration for being received within an opening of said connecting pin interior.

5. An apparatus according to claim 4, wherein said first fluid passage means comprises an elongate pipe supported within said adapter and protruding from one end thereof, being adapted to be inserted within the connecting pin interior, and a feed hole formed in said adapter body, extending from the exterior thereof to a part of said pipe positioned within said adapter.

6. An apparatus according to claim 4, wherein said second fluid passage means comprises a tubular insertion portion being carried by said adapter and protruding from said one end thereof for insertion into said connecting pin interior, and a drain hole in said adapter, extending from the exterior thereof and opening into a part of said insertion portion positioned within said adapter.

7. An apparatus according to claim 6, wherein said first fluid passage means comprises an elongate pipe supported within said adapter and protruding from one end thereof, being adapted to be inserted within the connecting pin interior, and a feed hole formed in said adapter body, extending from the exterior thereof to a part of said pipe positioned within said adapter.

8. An apparatus according to claim 7, wherein said elongate pipe is concentrically arranged within said insertion portion and protrudes beyond the end thereof remote from the adapter body.

9. An apparatus according to claim 1, wherein said means for resiliently biasing said adapter in water tight contact with said connecting pin comprises a compression spring having one end disposed against said adapter and means for generating compression power on said spring.

10. An apparatus for feeding and draining coolant through the interior of a connecting pin of a sealed and lubricated track link assembly, during a build-up welding operation thereon, comprising:
an adapter having first fluid passage means therein for introducing said coolant into said connecting pin interior and second fluid passage means for discharging said coolant from said connecting pin interior;
means for resiliently biasing said adapter in water tight contact with said connecting pin; and
means for performing said build-up welding operation associated with said connecting pin;
wherein said means for resiliently biasing said adapter in water tight contact with said connecting pin comprises a compression spring having one end disposed against said adapter and means for generating compression power on said spring and wherein said means for generating a compression power on said spring comprises a mounting plate against which the other end of said spring is disposed and fluid pressure operated cylinder means for applying pressure to said mounting plate to urge said adapter, through said compression spring, against said connecting pin.

11. An apparatus according to claim 4, wherein said means for resiliently biasing said adapter in water tight contact with said connecting pin comprises a compression spring having one end disposed against said adapter and means for generating compression power on said spring.

12. An apparatus for feeding and draining coolant through the interior of a connecting pin of a sealed and lubricated track link assembly, during a build-up welding operation thereon, comprising:
an adapter having first fluid passage means therein for introducing said coolant into said connecting pin interior and second fluid passage means for discharging said coolant from said connecting pin interior;
means for resiliently biasing said adapter in water tight contact with said connecting pin; and
means for performing said build-up welding operation associated with said connecting pin;
wherein one end of said adapter has a conical configuration for being received within an opening of said connecting pin interior, said means for resiliently biasing said adapter in water tight contact with said connecting pin comprises a compression spring having one end disposed against said adapter and means for generating compression power on said spring, and said means for generating a compression power on said spring comprises a mounting plate against which the other end of said spring is disposed and fluid pressure operated cylinder means for applying pressure to said mounting plate to urge said adapter, through said compression spring, against said connecting pin.

13. An apparatus for feeding and draining coolant through the interior of a connecting pin of a sealed and lubricated track link assembly, during a build-up welding operation thereon, comprising:
an adapter having first fluid passage means therein for introducing said coolant into said connecting pin interior and second fluid passage means for discharging said coolant from said connecting pin interior;
means for resiliently biasing said adapter in water tight contact with said connecting pin; and
means for performing said build-up welding operation associated with said connecting pin;
wherein one end of said adapter has a conical configuration for being received within an opening of said connecting pin interior, said second fluid passage means comprises a tubular insertion portion being carried by said adapter and protruding from said one end thereof for insertion into said connecting pin interior, and a drain hole in said adapter, extending from the interior thereof and opening into a part of said insertion portion positioned within said adapter;
said first fluid passage means comprising an elongated pipe supported within said adapter and protruding from one end thereof, being adapted to be inserted within the connecting pipe interior, and a feed hole formed in said adapter body, extending from the interior thereof to the part of said pipe positioned within said adapter;
said elongate pipe being concentrically arranged within said insertion portion and protruding beyond the end thereof remote from the adapter body; and,
said means for resiliently biasing said adapter in water tight contact with said connecting pin comprises a mounting plate, at least one support member on said mounting plate, compression spring means arranged between said support member and one end of said adapter, and fluid pressure operated means for urging said mounting plate in the direction of said adapter for maintaining said adapter in contact with said connecting pin through said compression spring.

14. An apparatus according to claim 1, wherein a plurality of adapters are resiliently biased by said biasing means and are connected with said first and said second fluid passage means.

* * * * *